June 21, 1938. E. KNAUSS Re. 20,768

GOVERNOR

Original Filed Sept. 22, 1931 3 Sheets-Sheet 1

INVENTOR

Edward Knauss

BY

ATTORNEY

June 21, 1938. E. KNAUSS Re. 20,768

GOVERNOR

Original Filed Sept. 22, 1931 3 Sheets-Sheet 2

INVENTOR

Edward Knauss

BY Percy S. Webster

ATTORNEY

INVENTOR
Edward Knauss
BY
ATTORNEY

Reissued June 21, 1938

Re. 20,768

UNITED STATES PATENT OFFICE 20,768

GOVERNOR

Edward Knauss, San Francisco, Calif., assignor, by mesne assignments, to Monarch Governor Company, Detroit, Mich., a corporation of Michigan Original No. 2,026,742, dated January 7, 1936, Serial No. 564,271, September 22, 1931. Application for reissue September 10, 1936, Serial No. 100,172

14 Claims. (Cl. 137—153)

This invention relates to governors for internal combustion engines and particularly represents improvements over the structure shown in by Patent No. 1,670,364 dated May 22, 1928. The present governor as well as that of the previous patent is of that type which consists essentially of a control valve interposed in the intake passage of the engine between the carburetor and the manifold and the movement of which valve is controlled by differences in the vacuum pressure in the passage.

It is of course desirable that a governor for this purpose shall function to automatically maintain a constant engine speed under varying load conditions, irrespective of the set position of the throttle valve of the engine.

In my previous structure as well as in other governors attempts have been made to attain an ideal result or functioning by the employment of a multiplicity of springs or other parts to produce a straight line graph which would indicate an actually constant engine speed. As far as I am aware however no such attempts have been wholly successful and even in my previous device which represented an improvement over existing governors, and which was designed to overcome this curve, I was unable to do so, and had to employ a number of springs and other parts to make the governor function at all.

I have finally succeeded however in attaining the desired result and the principal object of the present invention is to provide a governor which will function to maintain even engine speeds under all conditions.

A further object of the invention is to provide a device for the purpose in which the number of moving parts is reduced to a minimum so that friction in operation is reduced, manufacturing costs are lowered and there is practically nothing to get out of order or require replacement even after a long period of use. Also the structure is very easy to assemble and adjust when necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
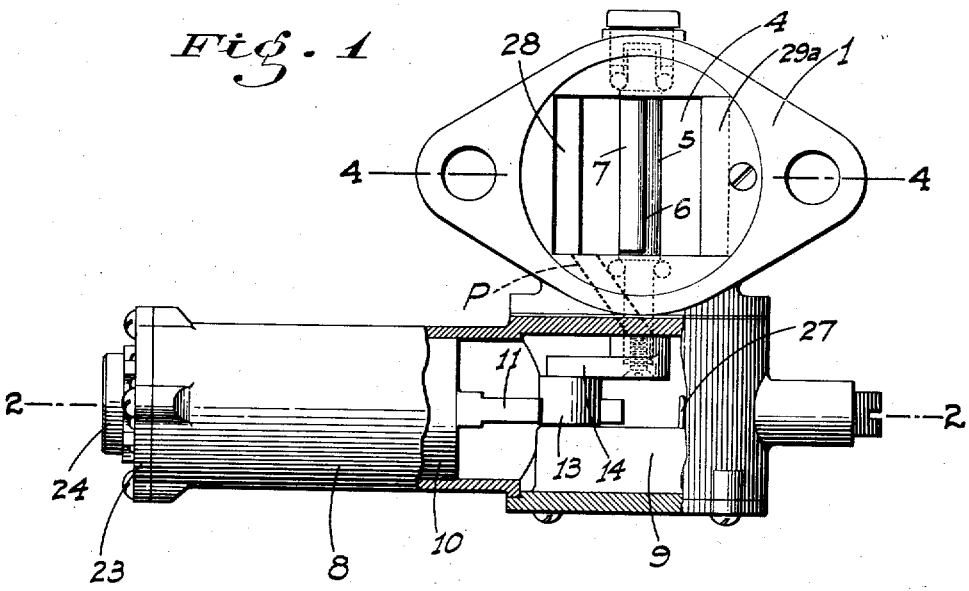
Fig. 1 is a top plan view of the governor partly in section showing the control valve in its normal wide open position.
Figure 2:
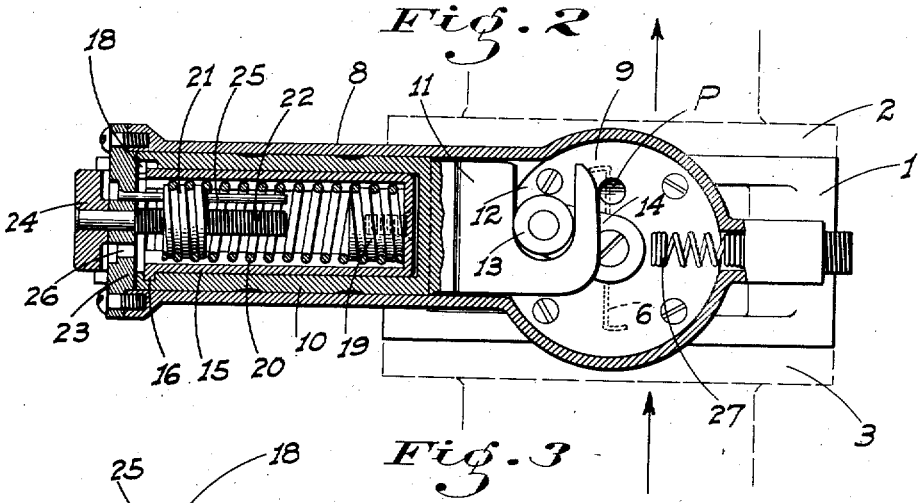
Fig. 2 is a longitudinal section on the line 2—2 of Fig. 1.
Figure 3:
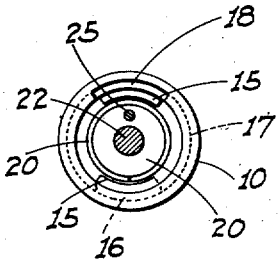
Fig. 3 is an end view of the piston unit.

Referring now more particularly to the characters of reference on the drawings, the numeral 1 denotes a flanged body adapted to be inserted between and secured to the flanges 2 and 3 of the intake manifold and carburetor respectively. The body 1 has a passage 4 preferably but not necessarily of rectangular cross section extending therethrough to communicate with the passages in the manifold and carburetor. A shaft 5 is turnably mounted in the body and extends transversely of the same centrally between its ends and has a rectangular valve 6 of the butterfly type secured thereto and having a reasonably close fit between the side walls of the passage. At its opposite ends the valve is formed with relatively short extensions 7 which face in opposite directions to the direction of closing movement of the valve. The purpose of these extensions will be seen later.

The governor structure for operating this valve comprises a cylinder 8 terminating at one end in a chamber 9 which is abutted against and secured to the body 1 on one side so as to extend tangentially thereof, and into which the shaft 5 projects. A port P is provided between the chamber and the passage 4 near the top of the latter, or above the center of the valve. The cylinder is disposed so as to be substantially in radial relation to the shaft. Slidable in the cylinder is a hollow piston 10 having on its inner end a relatively narrow head 11 projecting into the chamber and slotted as at 12 in a plane at right angles to the length of the piston. This slot engages a roller 13 mounted on the outer end of a crank arm 14 which is adjustably secured to the adjacent end of the shaft in a suitable manner. The crank is disposed slightly above a dead center position when the valve 6 is in a vertically disposed or wide open position at which time the roller is near the bottom of the slot.

The piston is open at its opposite or outer end and has a spring cage 15 removably seated therein. The longitudinal walls of the cage are preferably formed of opposed strips curved to fit the piston, one of which walls has an outwardly projecting flange 16 at its outer end. This flange is adapted to ride in a groove 17 cut in the inner periphery of the piston, the outside wall of the groove being cut away for a length not less than the arcuate length of the flange as shown at 18. This permits of the ready insertion and removal of the cage relative to the piston by a partial turning of the cage, while preventing longitudinal movement of the cage in the piston when once it is mounted in position.

A block 19 secured in the inner end of the cage forms the anchor for one end of a tension spring 20, the other end of which is anchored on a floating block 21. A screw 22 threaded through the block 21 projects through the end cap 23 of the cylinder 8 and is fixed in a turning knob 24 positioned on the outside of the cap. A pin 25 mounted in the cap parallel to the screw projects through the block 21 and permits longitudinal movement of the same. On turning the screw therefore the floating block is moved lengthwise and the tension of the spring is increased or decreased as the case may be. A port 26 through the end cap provides communication between the interior of the piston and the atmosphere.

An adjustable compression spring 27 is mounted in the chamber in opposed relation to the head 11 so as to be engaged thereby as the piston has advanced and turned the crank a certain distance.

Figure 4:
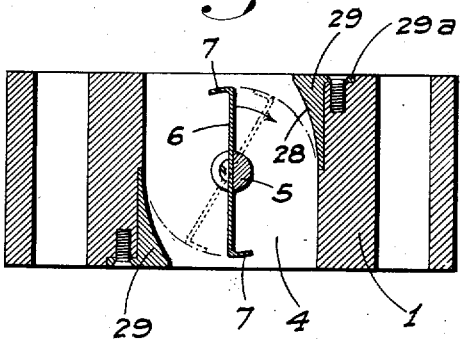
Fig. 4 is a sectional elevation of the valve and passage taken on the line 4—4 of Fig. 1.
Figure 5:
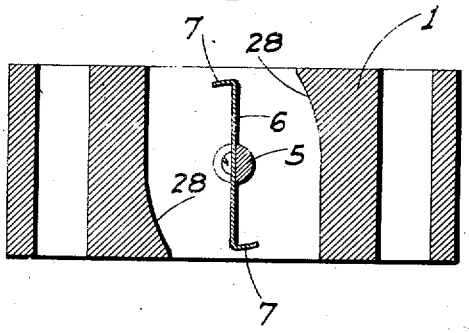
Figs. 5 and 6 are similar views showing a modified arrangement of the passage flares.
Figure 6:
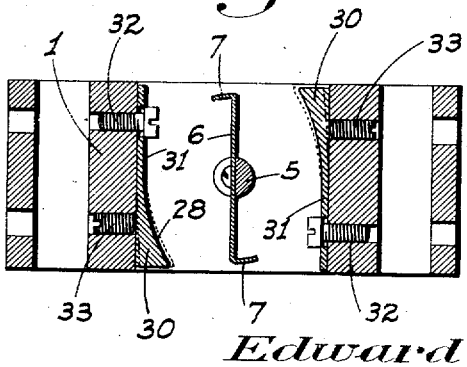

The opposite walls of the passage 4 only for that portion of their length toward which the ends of the valve move from an open position are formed with inwardly curved flares or shrouds 28 extending from approximately the level of the shaft 5 to the top or bottom of the body, or so that the flaring surfaces are eccentric to the circle of movement of the periphery of the valve, as plainly shown in Figs. 4, 5 and 6. In the arrangement shown in Fig. 4 these flares or shroud-like walls are formed as inserts 29 set in the body and having top flanges 29*a* removably secured to the body. In this manner said inserts can be removed and others having a different flare-curvature substituted if desired. In Fig. 5 the flare curves are shown as being formed integral with the body and hence non-changeable.

In Fig. 6 the flare or shroud-forming inserts 30 are also used. In this case however the inserts extend for the full height of the body and are thin and resilient at their ends opposite the flare curves as shown at 31. The thin portions of these inserts are secured to the body by screws 32 in such a manner that the vertical position of said inserts in the body may be altered. This enables the relative position of the flare curves to the arc of rotation of the valve to be altered. Toward their flaring ends the inserts are engaged on the back by set screws 33 so that the curved portions of the inserts may be pressed inwardly toward the center of the body passage. In this manner also the relation or positioning of the flare curves relative to the arc of movement of the valve may be altered.

The operation of the governor is as follows:

With the motor at rest, the governor valve 6 is held wide open by the tension of spring 20. As soon as the motor is started, a partial vacuum is formed in the manifold which is connected with chamber 9 through port P subjecting the entire head area of piston 10 in chamber 9 to this vacuum. The atmospheric pressure acting against the outer end of piston 10 through port 26 exerts a force tending to overcome the spring tension. As the motor speed increases the vacuum in chamber 9 also increases until the resistance of spring 20 is overcome, when piston 10 will be forced forward, raising the arm 14 and rotating valve 6 towards its closed position. The closing of valve 6 further increases the vacuum in chamber 9, since the port P is above the valve, and the atmospheric pressure on piston 10 keeps on moving it forward against the increased spring tension until the motor is held at the predetermined speed.

Now assume that the motor is running at 2000 R. P. M. without load, and with the carburetor throttle wide open so that a corresponding vacuum pressure is maintained in the intake passage and chamber 9. The atmospheric pressure acting with the vacuum pressure now holds piston 10 and valve 6 in a sufficiently closed position to maintain this speed. Suppose now we apply a light load; the engine speed tends to drop and the vacuum instantly starts to fall. As the spring force is at all points in substantial balance with the opposing atmospheric pressure, this allows spring 20 to pull piston 10 out, opening valve 6 an amount to take care of this load and counteracting the difference in vacuum drop. If this operation is repeated until the motor is pulling its full load, the governor valve 6 will then be wide open and the motor speed will still be approximately 2000 R. P. M.

It may be here noted that it is common practice to allow a drop in speed from no load to a full load of from 5 to 10% for stability. In other words if the vacuum and spring tension were perfectly balanced at all points there might be some surge. Now if the performance is reversed and the load decreased, the action of the governor will also be reversed, still holding the motor speed approximately constant.

It follows, therefore, that the governor automatically holds the motor speed within close limits regardless of load up to the limit for which it is set.

An important feature of this governor is that it cannot increase speed by reason of the carburetor throttle valve being only partially open. This is because the piston 10 only is the vacuum responsive member; and the valve 6 is not depended upon to start or assist in closing. The valve 6 does have a certain amount of closing torque but not sufficient to cause any particular difference in speed in relation to the opening of the carburetor throttle valve. When the carburetor throttle valve is only partially open the vacuum above it is built up, which of course is communicated through chamber 9 in the governor, causing the governor to close its valve an amount approximately corresponding to the opening of the carburetor throttle at any point below the governed speed.

Quick and sensitive response in operation is obtained by reason of the fact that all friction is eliminated except the sliding friction of the piston due to its weight and an extremely small amount between the roller 13 and the slot 12 and between the shaft 5 and its anti-friction bearings.

The highly important features of my invention are the means by which I have been able to produce a straight built-up vacuum line out of or instead of one of a naturally curved form. This result is obtained mainly by the use of the type of valve shown cooperating with a passage of the peculiar form disclosed, and which is a feature enabling a simple single spring-pressed control operating means to be used.

Referring to Figs. 4 and 6 it will be seen that the valve 6 divides the passage 4 into two parts; the valve restraining the passage at its opposite ends and the combined area of the two restrained portions when the valve is wide open being just sufficient to give the engine its full power. Now as the valve is moved toward its closed position it first has a relatively fast cut-off which gradually becomes less for each given amount of arcuate movement of the valve. Thus as the valve moves from wide open position toward closed position the open or effective area of the passageway past the valve will be diminished in substantially or approximately inverse ratio or proportion to the increase in the vacuum pull acting on the valve to close the same. This is due to the fact that the overhangs of the flared inserts are backing away or retracting relative to the leading edges of the valve. In other words, the area of the passage cut-off with a given closing movement of the valve becomes less and less as the valve moves toward its fully closed position; the curvature of the flares or shrouds being so positioned that this cut-off of the valve will produce the desired straight built-up vacuum line at different speeds as shown at A in Fig. 7. The beneficial result of the use of the flared passage over a straight sided one will be seen by comparing the lines A with the curved line B made with a straight passage.

Figure 7:
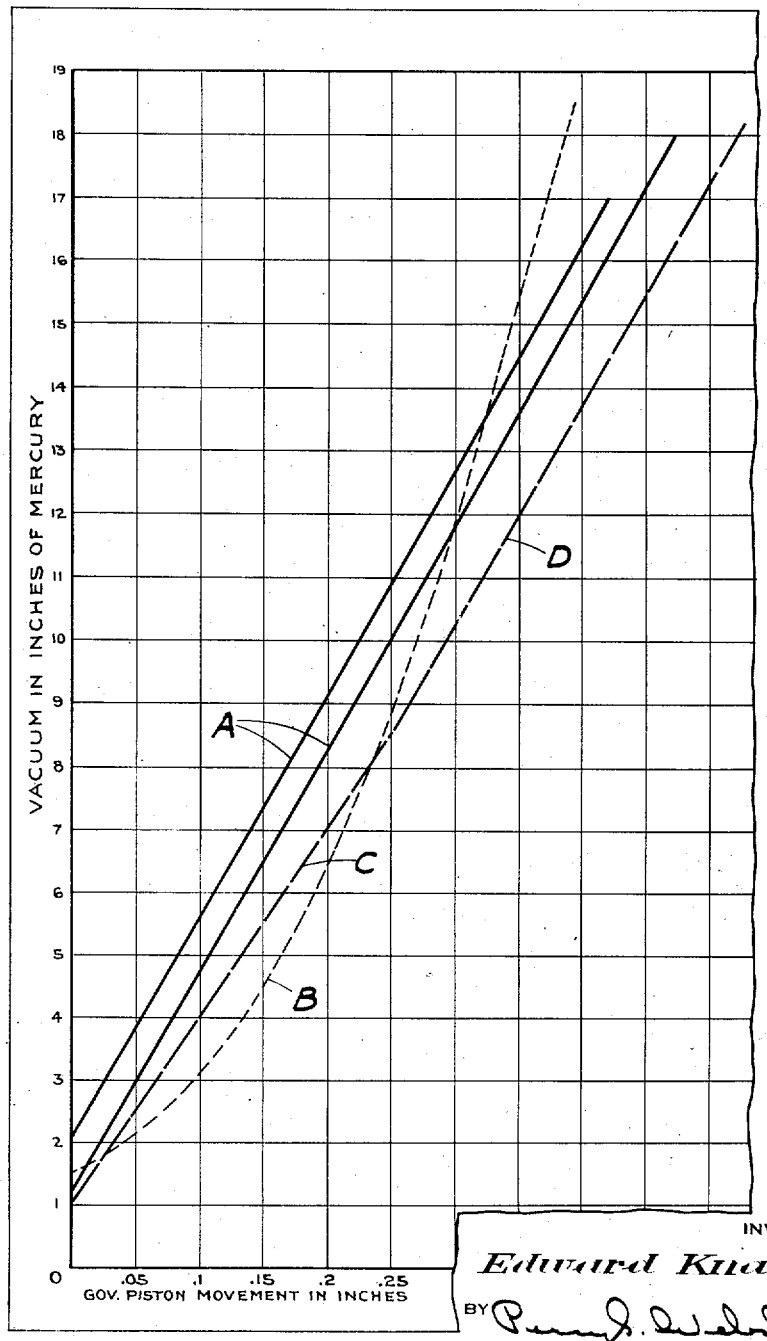
Fig. 7 is a diagram of a graph showing the straight vacuum line formed by the governor, as well as certain other vacuum lines.

In certain cases, such as very low engine speeds, it might be found more convenient to use two lines of vacuum build-up; the first being relatively flat as at C in Fig. 7 for approximately one-half the travel, then pitched up the balance of the way as shown at D. This would only be for the purpose of reducing the travel of piston 10. In this case we would use two springs; the spring 27, which is ordinarily used as a bumper spring would now be constructed or adjusted to control one line and spring 20 the other.

It is obvious that the shape or size of the flares will alter the vacuum line, therefore I have made provision for changing or adjusting them as shown in Fig. 6. Also the vacuum line can be altered by substituting a shorter or longer valve or by changing the angle of the valve in relation to the position of the control crank.

A valve, particularly of the butterfly type, after it leaves its vertical position, has a certain closing action all its own but is by no means uniform. It is in order to make this torque uniform that I have provided the extensions 7 faced in the opposite direction to the travel. These extensions are so shaped that they add to the closing torque for the full closing movement. While I prefer to use a valve with this uniform torque, it is not absolutely essential, as one without these extensions works quite well.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A governor for internal combustion engines comprising a vacuum responsive member, a valve connected with and operated by such member to control the flow of fuel to the engine, such valve comprising a casing having a passageway therethrough, a valve gate in the passageway, a pivot for the gate, the opposite walls of the passageway for that portion of their length toward which the leading edges of the gate move from open to closed position being formed with curved shrouds eccentric to the circular path of movement of the periphery of the gate which overhang the gate only after it has made a predetermined movement toward closing position, the shrouds being so proportioned that the diminution of the open area of the passageway as the gate moves to closed position will be in substantially inverse ratio to the increase in the vacuum pull exerted on the vacuum responsive member.

2. A governor for internal combustion engines comprising a vacuum responsive member, a valve connected with and operated by such member to control the flow of fuel to the engine, such valve comprising a casing having a passageway therethrough, a valve gate in the passageway, a central pivot for the gate, the opposite walls of the passageway for that portion of their length toward which the leading edges of the gate move from open to closed position being so formed eccentric relative to the circular path of movement of the leading edges of the gate that as the latter moves toward closed position the open area through the passageway will be diminished in substantially inverse ratio to the increase in the vacuum pull exerted on the vacuum responsive member.

3. A governor for internal combustion engines comprising a vacuum responsive member, a valve connected with and operated by such member to control the flow of fuel to the engine, such valve comprising a casing having a passageway therethrough, a valve gate in the passageway, a central pivot for the gate, the opposite walls of the passageway for that portion of their length toward which the leading edges of the gate move from open to closed position being formed with inwardly extending, independent and removable elements constituting flares disposed in eccentric relation to the periphery of the gate which overhang the gate after it has made an initial movement toward closing position, the flares being so proportioned that the diminution of the open area of the passageway as the gate moves to closed position will be in substantially inverse proportion to any increase in the vacuum pull exerted on the vacuum responsive member.

4. A governor for internal combustion engines comprising a vacuum responsive member, a valve connected with and operated by said vacuum responsive member and through which valve the fuel mixture is adapted to flow to the engine, such valve comprising a casing having a passage therethrough, a gate in the passage adapted to control the flow of mixture therethrough, a pivot for the gate, the opposite walls of the passageway for that portion of their length toward which the leading edges of the gate move from open to closed position being formed with flared shroud portions disposed in eccentric relation to the periphery of the gate and extending each from an inception approximately opposite the pivot toward the leading edge of the gate cooperable therewith and adapted to overhang the gate after it has made a first initial movement toward closing position, the degree of flare being such that after an initial maximum movement of the gate toward closing position, succeding movements of the gate toward such closing position will result in a variation in the effective area of the passageway past the gate inversely proportioned to the variation in the vacuum pull exerted on the vacuum responsive member.

5. In a governor for internal combustion engines, which includes a passageway for mixture, a normally open butterfly valve pivoted in said passageway, and a vacuum responsive controlling member for said valve; the walls of said passageway on opposite sides being provided with curved shroud-like portions disposed in eccentric relation to the circular path of movement of the periphery of the valve and cooperating therewith as the leading edges of said valve move toward areas in said passage of progressively increasing diameter to provide an initially quick reduction of the area of the passageway as the valve initially moves toward a closed position, and then a progressively diminishing reduction of the area of said passageway with further movements of the valve toward a closed position.

6. A governor for internal combustion engines comprising a vacuum responsive member, a valve connected with and operated by such member to control the flow of fuel to the engine, such valve comprising a casing having a passageway therethrough, a valve gate in the passageway, a pivot for the gate, and a flare formed on a wall of the passage opposite the pivot and extending toward one end of the passage in divergingly eccentric relation to the circular path of movement of the leading edge of the gate, said flare being arranged relative to said leading edge to provide a cross sectional area of the passageway of less diameter near the open position of said leading edge than near the closed position thereof.

7. In a governor for an internal combustion engine, which includes a passageway for mixture, a normally open butterfly valve pivoted in said passageway, and a vacuum responsive controlling member for said valve; the walls of said passageway on opposite sides being curvilinear and disposed in eccentric relation to the circular path of movement of the periphery of the valve and cooperating therewith as the leading edges of said valve move toward areas in said passage of progressively increasing diameter to provide for equal increments of valve movement an initially quick reduction of the area of the passageway as the valve initially moves toward a closed position and then a progressively diminishing reduction of the area of said passageway with further movements of the valve toward a closed position.

8. In a governor for an internal combustion engine, which includes a passageway for mixture, a normally open butterfly valve pivoted in said passageway, and a vacuum responsive controlling member for said valve; the walls of said passageway on opposite sides being curvilinear to form shrouds overhanging the leading edges of the valve when in a closed position, said shrouds being disposed in eccentric relation to the circular path of movement of the periphery of the valve and cooperating therewith to provide areas in said passageway of progressively increasing diameter as the valve moves toward closed position.

9. In a vacuum operated governor for an internal combustion engine, which includes a passageway for mixture, a normally open butterfly valve pivoted in said passageway and movable toward closed position by the operation of the engine, the walls of said passageway on opposite sides of the valve comprising curved shroud-like portions disposed eccentric to the curvilinear path of movement of the opposite leading edges of the valve and overhanging said edges when the valve is at or near its closed position, said shroud-like portions cooperating with the leading edges of the valve to provide areas in said passageway of progressively increasing diameter as the valve moves toward closed position.

10. In a vacuum operated governor for an internal combustion engine, which includes a passageway for mixture, a normally open butterfly valve pivoted in said passageway and movable toward closed position by the operation of the engine, the walls of said passageway on opposite sides of the valve having inserts comprising curved wall portions disposed eccentric with relation to the curvilinear path of travel of the valve and overlying the opposite leading edges of the valve when at or near its closed position, and means for adjusting an insert or both inserts to vary the eccentric relation thereof, said wall portions cooperating with the leading edges of the valve to provide cross sectional areas in said passageway of progressively increasing diameter as the valve moves toward closed position.

11. In a vacuum operated governor for an internal combustion engine, which includes a passageway for mixture, a butterfly valve pivoted in said passageway and movable toward closed position by the operation of the engine, spring means resisting closing movement of the valve, the wall of said passageway at a side of the valve having an insert provided with a curved wall portion eccentric with relation to the curvilinear path of travel of the valve, and means for adjusting said insert to vary the eccentric relation thereof, said insert providing a progressive widening of the passageway in the direction of closing of the valve.

12. In a vacuum operated governor for an internal combustion engine, which includes a passageway for mixture, a butterfly valve pivoted in said passageway and movable toward closed position by the operation of the engine, spring means resisting closing movement of the valve, the wall of said passageway at a side of the valve having an adjustable insert provided with a curved shroud-like portion eccentric with relation to the valve and cooperable with the adjacent leading edge of the valve to produce for equal increments of movement of the valve a disproportionately greater closing of the passageway near the wide open position of the valve than near its closed position, said insert providing a progressive widening of the passageway in the direction of closing of the valve.

13. In a vacuum operated governor for an internal combustion engine, which includes a passageway for mixture, a normally open butterfly valve pivoted in said passageway and movable toward closed position by the operation of the engine, a spring opposing said closing movement, and a curved shroud-like wall at a side of the valve eccentric with relation thereto and cooperating with the adjacent leading edge of the valve to produce a progressive widening of the passageway in the direction of closing of said edge of the valve.

14. In a vacuum operated governor for an internal combustion engine, which includes a passageway for mixture, a normally open butterfly valve pivoted in said passageway and movable toward closed position by the operation of the engine, a spring opposing said closing movement, and curved shroud-like walls at opposite sides of the valve eccentric with relation thereto and each cooperating with the adjacent leading edge of the valve to produce a progressive widening of the passageway in the direction of closing of said edge of the valve, said shroud-like walls having the major portions thereof disposed respectively above and below the valve axis.

EDWARD KNAUSS.